United States Patent [19]

Forrestal

[11] Patent Number: 4,928,419
[45] Date of Patent: May 29, 1990

[54] ICE FISHING APPARATUS AND SIGNALING DEVICE

[76] Inventor: Joseph M. Forrestal, 1800 Patton Pl., Janesville, Wis. 53546

[21] Appl. No.: 316,234

[22] Filed: Feb. 27, 1989

[51] Int. Cl.⁵ .......................................... A01K 93/00
[52] U.S. Cl. ....................................................... 43/17
[58] Field of Search ................................... 43/17, 17.1

[56] References Cited

U.S. PATENT DOCUMENTS

| | | | |
|---|---|---|---|
| 2,654,176 | 10/1953 | Kachelski | 43/17 |
| 3,382,598 | 5/1968 | Wilson . | |
| 4,437,255 | 3/1984 | Reed | 43/17 |
| 4,616,437 | 10/1986 | Harvey . | |
| 4,625,446 | 12/1986 | Morimoto . | |
| 4,640,038 | 2/1987 | Jershin . | |
| 4,658,531 | 4/1987 | Morimoto . | |
| 4,727,673 | 3/1988 | Dumar . | |

Primary Examiner—M. Jordan
Attorney, Agent, or Firm—Lathrop & Clark

[57] ABSTRACT

An ice fishing apparatus and signaling device (10) includes a base (12), a fishing line (22) depending from the base (12) and having a hook (36) on its end, a trigger (38), a transmitter (60), and a receiver (62). An arm (42) is spring mounted to the base (12) such that it is movable from a trigger held horizontal position to a vertical position. The arm (42) moves from the horizontal position to the vertical upon a fish strike, thus engaging a switch (64) that completes a circuit that produces a radio signal from the transmitter (60) to the receiver (62).

4 Claims, 3 Drawing Sheets

ICE FISHING APPARATUS AND SIGNALING DEVICE

FIELD OF THE INVENTION

The present invention relates generally to a fishing apparatus having particular utility in ice fishing and specifically to an apparatus for signaling that a fish strike has occurred.

BACKGROUND OF THE INVENTION

A tip-up is an ice fishing apparatus well-known in the art which includes a base that spans a hole in the ice, a reel assembly wound with a fishing line, a trigger mechanism, and a means for signaling the user upon the incidence of a fish strike. U.S. Pat. Nos. 2,654,176 and 4,727,673 issued to Kachelski and Dumar, respectively, show representative tip-ups. U.S. Pat. No. 4,616,437 issued to Harvey shows an alternate ice fishing apparatus that mounts above a hole in the ice and that signals the user when a fish is snagged. Tip-ups and other similar ice fishing apparatuses enable the user to leave the fishing site for a warm location or to attend to other activities, though the fishing site must still be monitored, even at a distance.

Common signaling means include flags and light. The use of a signal light may not be readily discernible to an observer during daylight hours, particularly where the brightness of the environment is accentuated by snow and ice. In conditions of poor visibility, such as where it is snowing or foggy, the signal light may be cloaked from view of the user. The use of a flag by itself would be of limited utility during the night time. In all of the aforementioned instances, constant visual surveillance of the fishing site is required. Such constant surveillance is difficult to sustain where there are a plurality of fishing sites that are being maintained, or where the user is preoccupied by other activities.

U.S. Pat. No. 4,616,437 to Harvey suggests the use of an audible alarm or horn that signals a fish strike. However, similar difficulties may occur in that the user could wander beyond earshot of the alarm or horn, the alarm may be made more difficult to hear in windy conditions, or the user may not be able to readily determine which fishing site has received a strike where there are a plurality of fishing sites that are being maintained.

A need has therefore existed for an ice fishing apparatus that signals the user of a fish strike, even if the user is stationed at a remote distance. The apparatus needs to extend the usable range beyond normal eyesight and earshot and not require constant surveillance.

SUMMARY OF THE INVENTION

In accordance with the present invention, an ice fishing apparatus and signaling device includes modifications to a conventional tip-up that transmits a signal to a receiver on the person of the user upon the incidence of a fish strike. The ice fishing apparatus and signaling device includes a base that spans a hole in the ice, a fishing line depending from the base, a trigger, and a transmitter. An arm is spring mounted to the base such that it is movable from a trigger-held horizontal position to a vertical position. The arm is set to the horizontal position to await a fish strike and the trigger releases the arm to a vertical position upon the incidence of a fish strike. The movement of the arm from the horizontal to the vertical position engages a switch which completes a circuit that produces a signal in the transmitter. A remote receiver is set to the frequency of the transmitter so that the signal is made audible to the user. Where the user maintains several fish sites, each having an ice fishing apparatus and signaling device in accordance with the present invention, the different transmitters of each of the apparatuses and devices may be set to transmit with different and distinguishable pulse patterns. Upon receipt of a transmission signal, the user is able to determine which of the sites had the fish strike.

The ice fishing apparatus and signaling device is thus able to be used during the daytime or nighttime, or under weather conditions that reduce visibility, and the apparatus and device does not need to made visible to the user. The fish sites at which the ice fishing apparatus and signaling devices of the present invention have been set do not need to be constantly monitored in that an instantaneous and audible signal is received by the user upon the incidence of a fish strike. The ice fishing apparatus and signal device is capable of use at more than one location with use of only one receiver, as the use of different pulses identifies the location of the fish strike. The user can be a substantial distance away from the fishing site as long as the user is in the zone of signal transmission.

Further objects, features and advantages of the invention will be apparent from the following detailed description taken in conjunction with the accompanying drawings.

DESCRIPTION OF THE PREFERRED EMBODIMENT

Figure 1:
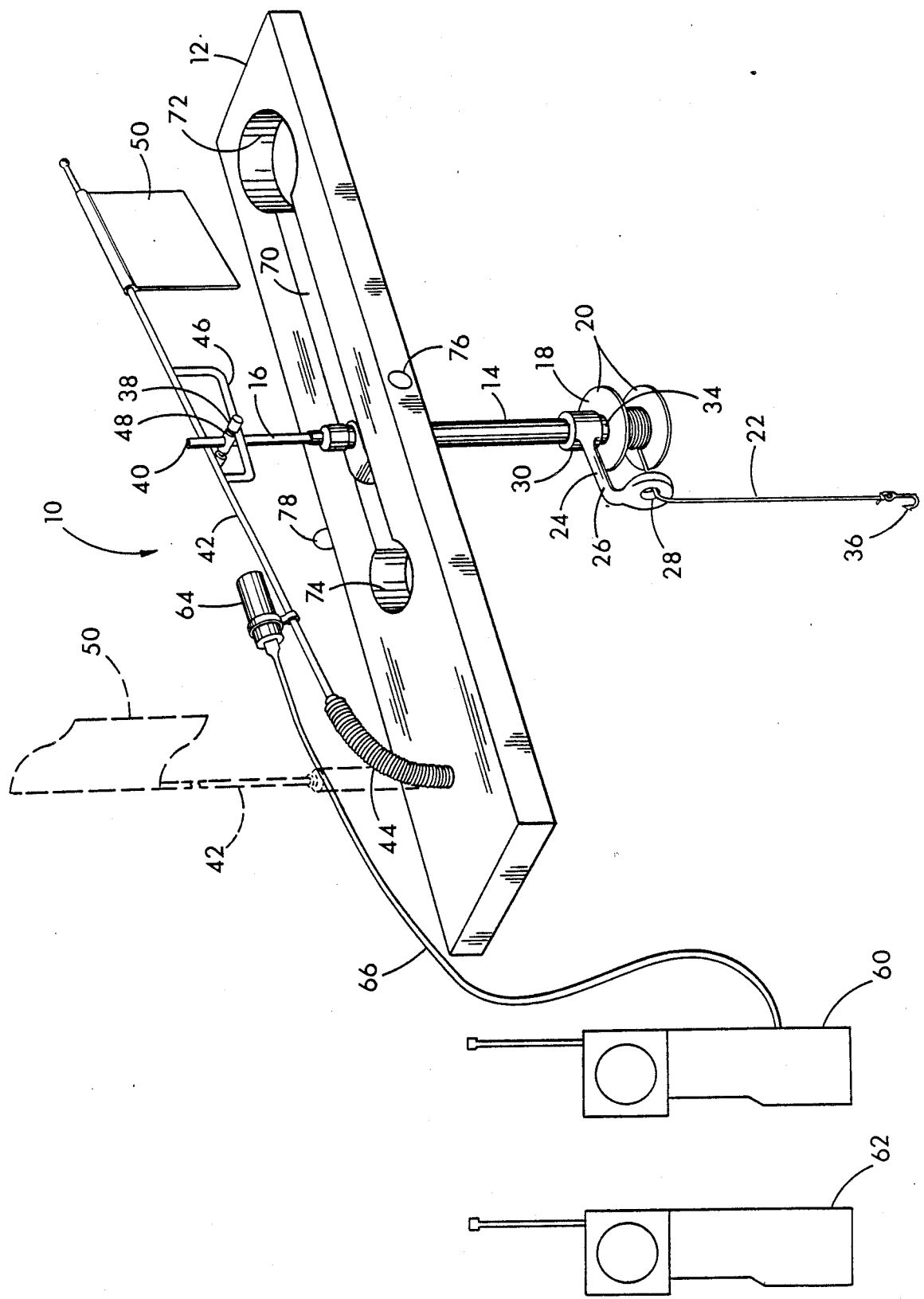
FIG. 1 is a perspective view of the ice fishing apparatus and signaling device as it would appear disposed over an ice hole with the arm in a horizontal position, the dotted lines showing the arm in a vertical position.

With reference to the drawings, an ice fishing apparatus and signaling device is shown generally at 10 in FIG. 1. The apparatus is of the tip-up variety such as that disclosed in U.S. Pat. No. 2,654,176 issued to Kachelski, et al., the disclosure of which is hereby incorporated by reference for a description of the tip-up apparatus. The apparatus 10 includes a base 12 in the form of a wooden or metal board of sufficient length to span a drilled or chopped hole in the ice. Located centrally in the base 12 is a tube 14 extending vertically through the base 12 and housing a rotatable shaft 16. Attached to the lower end of the shaft 16 is a reel 18 with flanges 20 mounted thereon. A fishing line 22 is stored on the reel 18 in a conventional manner. The shaft 16 and the reel 18 are connected for simultaneous rotation.

Figure 2:
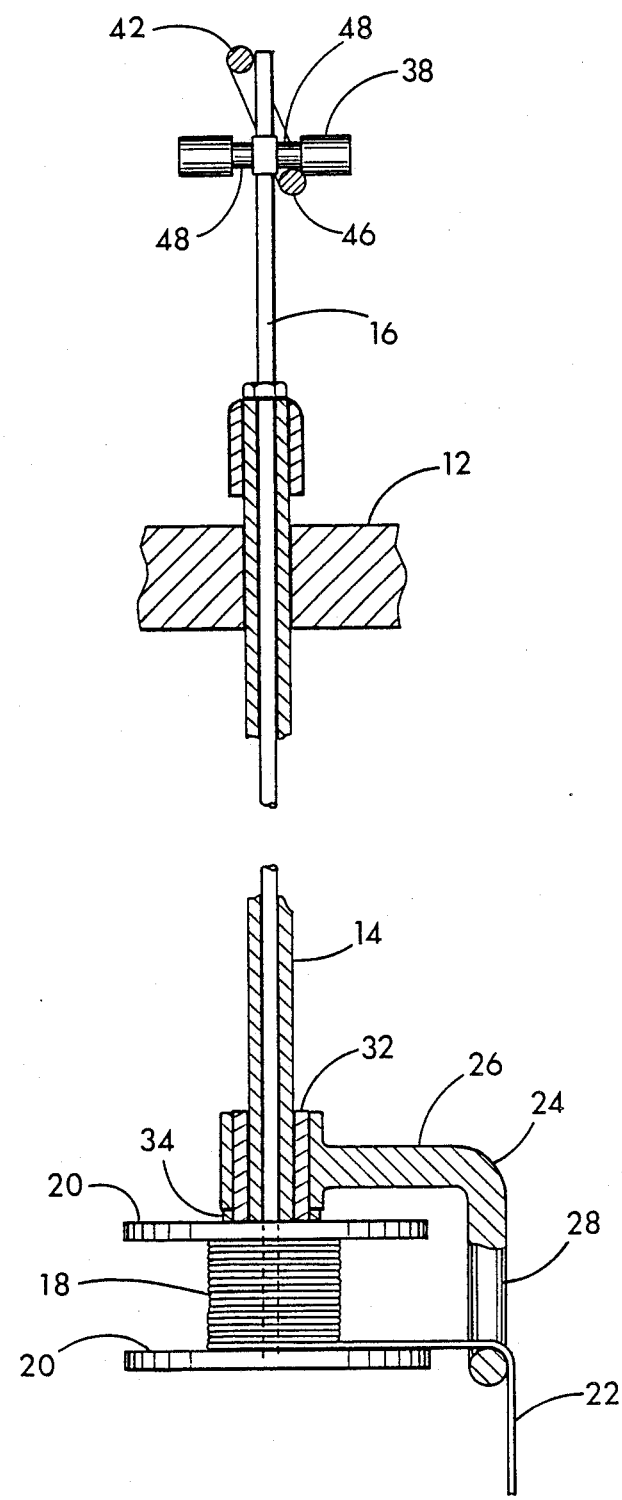
FIG. 2 is a cross-sectional view of the ice fishing apparatus and signaling device as viewed along line 2—2 of FIG. 1.

As illustrated in FIGS. 1 and 2, the lower end of the tube 14 is provided with a line guide 24 which comprises an arm 26 and an eye 28. The arm 26 projects substantially at a right angle from a collar 30 which is rotatable upon a bushing 32 which is pressed over the tube 14. The bushing 32 is provided with an annular shoulder 34 upon which the line guide collar 30 is rotatably seated. The eye 28 is rotatable on the arm 26 concentrically of the reel 18 so that the line 22 strung through the eye 28 and wound upon the reel 18 is radially payed out from the reel 18. Because the line guide collar 30 is rotatable with respect to the tube 14, the line guide collar 30 will swing in whatever direction a fish taking a hook 36 at the end of the line 22 swims, thereby ensuring an even unwinding of the line 22 from the reel 18. As pressure from the strike is continued, the reel 18 rotates to supply additional line and causes the shaft 16 to rotate.

The upper portion of the shaft 16 is provided with a transverse trigger 38 having at least one and preferably two grooves 48 located on either side of the shaft 16. The trigger is positioned near the top end 40 of the shaft 16. The trigger 38 is rigidly fixed to the shaft 16 so that rotation of the reel 18 will be transmitted through the shaft 16 to similarly rotate the trigger 38.

An arm 42 is fixed upon a coil spring 44 to the base 12 at a point remote from the point where the tube 14 extends through the base 12. The coil spring 44 normally biases the arm 42 to a vertical upright position shown in the dotted lines in FIG. 1. The arm 42 is readily bendable via the coil spring 44, to permit generally horizontal positioning of the arm 42 for engagement with the trigger 48. The arm 42 is provided with an offset bar 46 adapted to be received in the grooves 48 of the trigger 38. The grooves 48 provide detent areas to receive the offset bar 46 and to present camming surfaces to facilitate release of the arm 42 when a fish strike occurs.

The ice fishing apparatus and signaling device 10 may also incorporate a longitudinal slot 70 with enlarged openings 72 and 74 at either end of the slot 70. The tube 14 is pivotally mounted within the slot 70 on a pivot pin 76 which is further provided with a wing-nut 78. The apparatus and device 10 may be folded into a compact assembly by loosening the wing-nut 78 and swinging the tube 14 with the enlarged opening 72 and the trigger 38 is similarly nestled within the enlarged opening 74. Folding of the apparatus and device 10 is depicted at FIG. 5 of U.S. Pat. No. 2,654,176 issued to Kachelski, et al.

In the operation of a convention tip-up, the apparatus 10 is readied by setting the arm 42 to a generally horizontal position, the offset bar 46 being received in one of the grooves 48 of the transverse trigger 38. At such time when a striking fish becomes snagged in the hook 36, the reel 18 is caused to rotate, as previously described, thereby causing rotation of the shaft 16 and rotation of the trigger 38 attached to the shaft 16. This results in release of the offset bar 46 and the arm 42, which is moved to an upright position by the coil spring 44, as shown in phantom in FIG. 1. The movement of the arm 42 to an upright position is a visual signal to the user that a fish strike has occurred. The arm 42 may include a flag 50 on its end for accentuation purposes.

The prior art uses the aforementioned assembly with just the flag 50, or by a light source, as a means of signaling the user that a fish strike has occurred. The upright position of the flag 50 or the movement of the arm 42 to an upright position triggers a light that apprises the user of a fish strike. See U.S. Pat. Nos. 2,654,176 and 4,727,673 issued to Dumar and Kachelski, et al., respectively. The ice fishing apparatus and signaling device 10 of the present invention employs a battery-powered transmitter 60 that sends a signal to a receiver 62 that provides immediate audible notification to the user of a fish strike. The receiver 62 would be typically strapped to the user's belt or held in hand so that the user would necessarily remain in earshot of the signal indicative of a strike. By themselves, battery-powered transmitters and receivers are known to the art. The receiver 62 may be a standard walkie-talkie or similiar receiver adjusted to receive signals on the same radio frequency as that of the transmitter 60. As an option, the receiver 62 may be adaptable to also receive and transmit over an emergency radio frequency, which may be of considerable benefit to ice user in remote locations and in extreme weather conditions.

The transmitter 60 operates in the following manner. A switch 64 is mounted on the arm 42 so that the switch 64 is "on" when the arm 42 is in a vertical or upright position and "off" when the switch 64 is in a horizontal position. Exemplary switches include mercury switches, gravity-actuated, or mechanical switches, though a mercury switch may be preferable. As depicted in FIG. 1, the transitter 60 has a cable 66 running between the switch 64 and the transmitter 60. Wires contained within the cable 66 form a circuit that includes the switch 64. The switch 64 completes the circuit with the transmitter 60 when the arm 42 is upright and the circuit is disconnected when the arm 42 is horizontal. The battery of the transmitter 60 is thus deactivated when the transmitter 60 is not producing a signal. The transmitter 60 is actuated to produce a signal, which is receivable by the receiver 62, when the arm 42 is released to the upright position, caused by the rotation of the trigger 38 when a fish is snagged, the ice fishing apparatus and signaling device 10 operating in the manner heretofore described.

Figure 3:
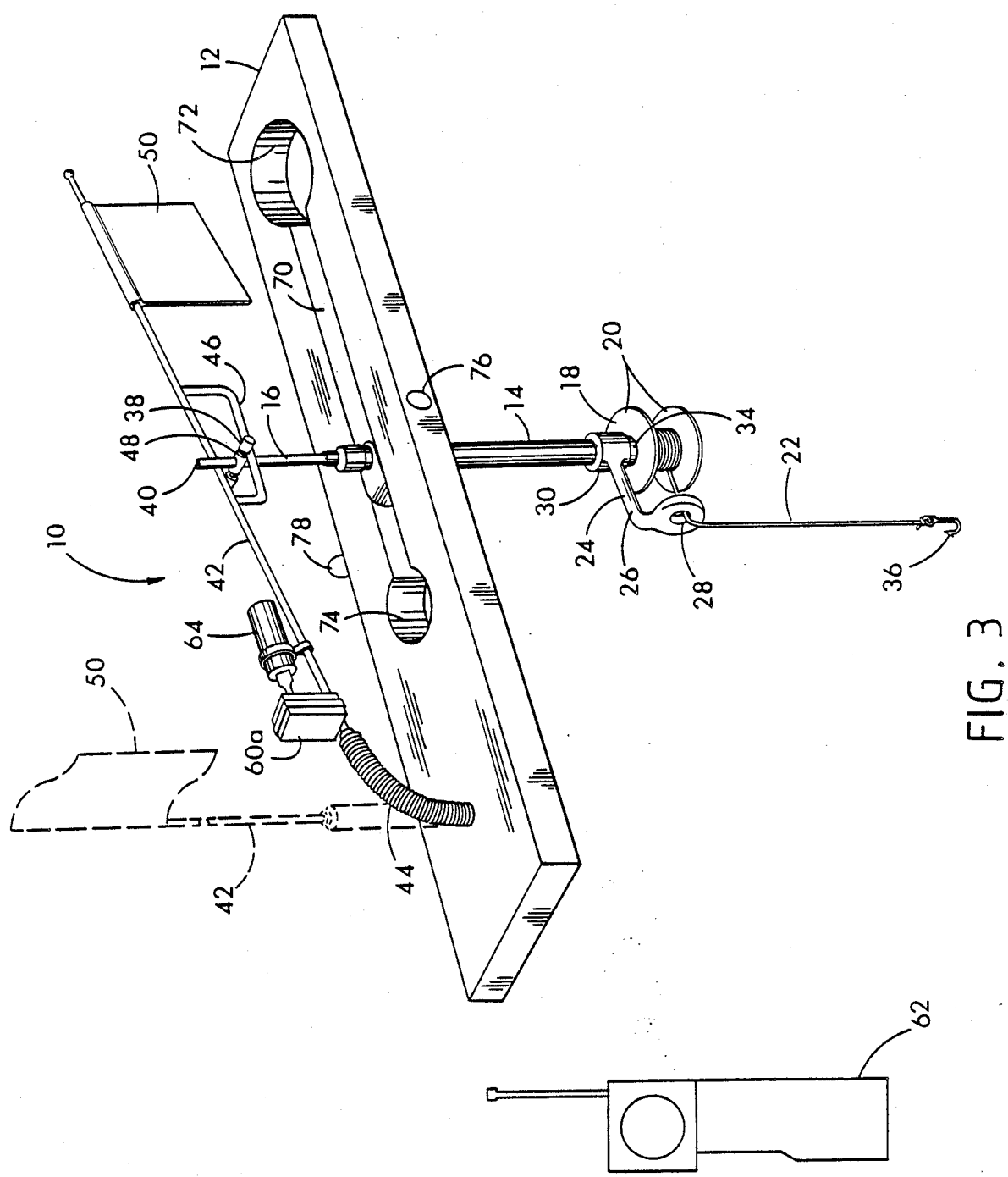
FIG. 3 is a perspective view of an alternative embodiment of the ice fishing apparatus and signaling device as it would appear disposed over an ice hole with the arm in a horizontal position, the dotted line showing the arm in a vertical position.

FIG. 3 shows an alternate arrangement of the ice fishing apparatus and signaling device 10 of the present invention. In this arrangement, the transmitter 60a is attached to the arm 42 and the arm 42 is connected to be used as an antenna for the transmitter 60a. When used as an antenna, the arm 42 must be metallic, though a wire leading from the transmitter 60a and running the length of the arm 42 may be an acceptable substitute. The switch 64 operates in the same manner to open and close a circuit that produces a signal.

A signal produced by the transmitter 60 or 60a would typically be a pulse at a pre-selected radio frequency having a repeating pattern. Where the user maintains several fish sites, each having an ice fishing apparatus and signaling device 10 in accordance with the present invention, the different transmitters may be set to transmit with different and distinguishable pulse patterns. This enables the user, upon receiving a signal of a fish strike, to immediately ascertain which of the fish sites has had a stike. The production of a signal by the transmitter 60 or 60a and at the generation of different pulse patterns are known in the art.

The present invention encompasses both complete assemblies of the ice fishing apparatus and signaling device, as well as a transmitter adaptable for use with existing tip-ups. It is understood tha the invention is not confined to the particular construction and arrangement of parts herein illustrated and described, but embraces such modified forms thereof as come within the scope of the following claims.

What is claimed is:

1. An apparatus for ice fishing comprising:
   (a) a base adaptable to span a hole in the ice;
   (b) a fishing line depending from the base;

(c) a trigger located proximate the base and engageable with the fishing line to be operated in response to a strike on the fishing line;
(d) a transmitter engageable with the trigger, the transmitter producing a radio signal when the trigger is operated in response to a strike on the fishing line such that the radio signal is remotely receivable by a receiver;
(e) an arm that is spring mounted to the base and extending between the trigger and the transmitter, the arm being movable from a trigger-held horizontal position to a vertical position, which actuates the transmitter to produce a signal; and,
a switch attached to the arm which forms a part of a completed circuit that enables the transmitter to produce a signal when the arm is in the vertical position.

2. The apparatus of claim 1 wherein the switch is a mercury switch.

3. A device for use in an apparatus for ice fishing that includes a base adaptable to span a hole in the ice, a fishing line depending from the base, a trigger located proximate the base and engageable with the fishing line to be operated in response to a strike on the fishing line, and an arm that is spring mounted to the base and being movable from a trigger-held horizontal position to a trigger-released vertical position, the device comprising a transmitter engageable with the trigger, the transmitter producing a radio signal when the trigger is operated in response to a strike on the fishing line such that the radio signal is remotely receivable by a receiver, and the device further comprising a switch attached to the arm which forms part of a completed circuit that enables the transmitter to produce a signal when the arm is in the vertical position.

4. The device of claim 3 wherein the switch is a mercury switch.

* * * * *